(No Model.)
J. N. ALTMAN.
VEHICLE WHEEL.
No. 563,703.  Patented July 7, 1896.
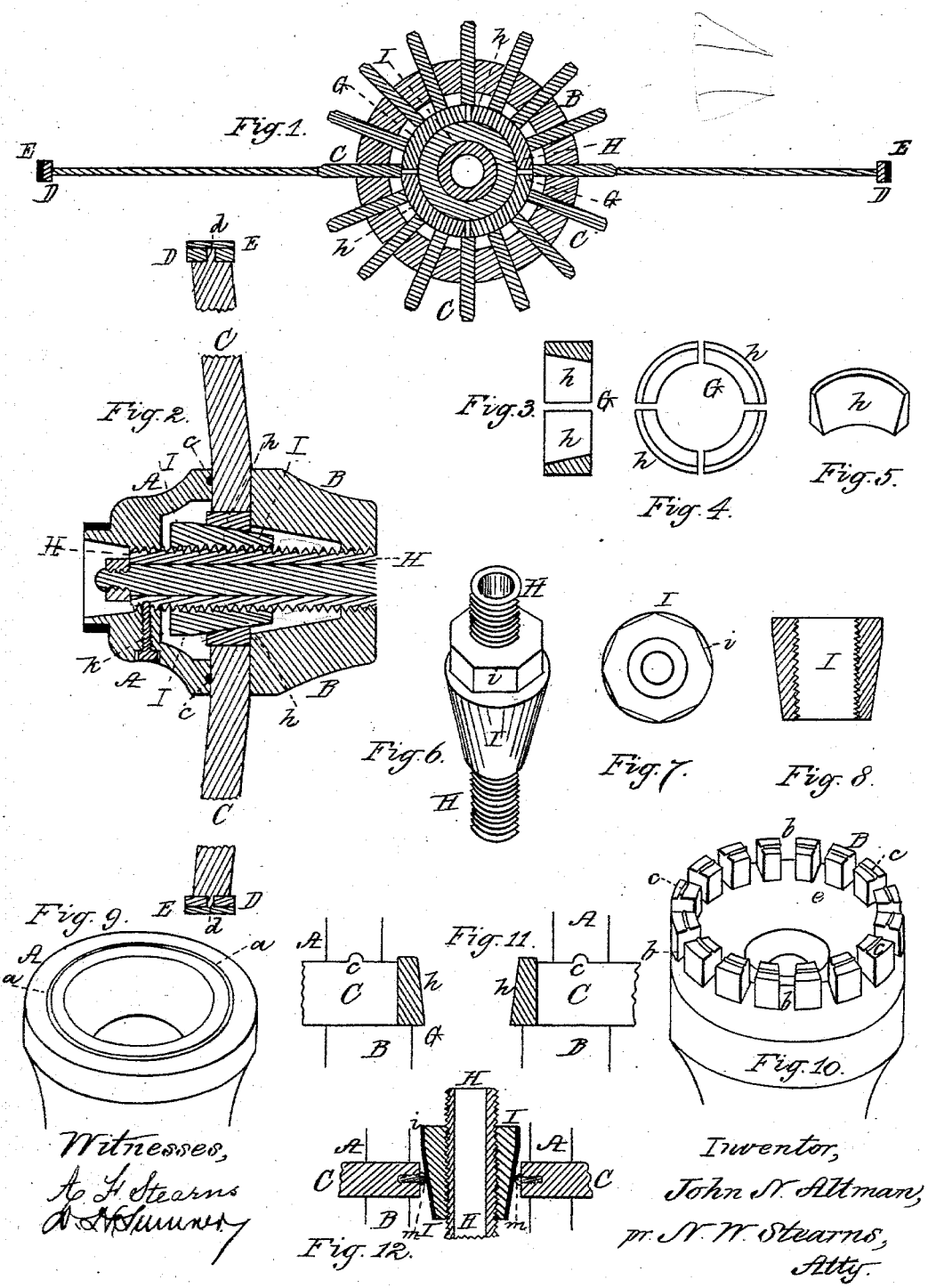
Witnesses,
A. F. Stearns
[signature]
Inventor,
John N. Altman,
pr. N. W. Stearns,
Atty.

UNITED STATES PATENT OFFICE.

JOHN N. ALTMAN, OF TAMPA, FLORIDA.

VEHICLE-WHEEL.

SPECIFICATION forming part of Letters Patent No. 563,703, dated July 7, 1896.

Application filed November 29, 1895. Serial No. 570,482. (No model.)

*To all whom it may concern:*

Be it known that I, JOHN N. ALTMAN, of Tampa, Hillsborough county, Florida, have invented certain Improvements in Vehicle-Wheels, of which the following is a full, clear, and exact description, reference being had to the accompanying drawings, making part of this specification, in which—

Figure 1 is a diametrical vertical section (taken at right angles to the axis of revolution) through a wheel constructed in accordance with my invention. Fig. 2 is a diametrical vertical section taken in the plane of the axis—i. e., on the line x x of Fig. 1. Figs. 3, 4, and 5 represent different views of my sectional bearing for supporting the inner ends of the spokes; Figs. 6, 7, and 8, views of the conical nut for moving the sectional bearing; Figs. 9 and 10, views of the two portions of the hub; Fig. 11, detail, enlarged, to be referred to; Fig. 12, modification of my invention.

Various influences unite to impair the good running condition of vehicle-wheels, for instance, the changes in the atmosphere from wet to dry, cold to warm, and vice versa, as well as the wear incident to continued use, the consequence being the parts become loose, such as one or more spokes within the hub, and the felly or portions of it are not properly supported thereby. With wheels in which the spokes are permanently secured within the hub, the owner is compelled to go to a carriage or black smith, often located at a distance, and employ him to repair and "set up" the parts.

The aim of my present invention is to provide a wheel so constructed that each spoke is adapted for ready removal, replacement, and adjustment by any person of ordinary intelligence without the use of a set of tools; and this invention consists in certain details of construction, which will be hereinafter fully described and claimed.

In the said drawings the hub is represented in two portions. A is the outer portion provided with an annular groove $a$, and B the inner portion having a series of sockets $b$, into which snugly fit the inner ends of the spokes C, the solid parts of this portion of the hub interposed between the ends of the spokes being provided with a series of narrow flanges $c$, which fit into the annular groove $a$ and protect the parts from exposure to the weather, the end of each spoke being firmly clamped in place between the two hub portions A B.

The outer end of each spoke has a small tongue $d$, which enters a hole for it in the felly D. E is the tire. The inner surface $e$ of the portion B lies flush with the plane of the inner or closed ends of the sockets and has located therein a sectional bearing G, composed of preferably four or more pieces, which taper inwardly toward each other, forming separable wedges $h$ $h$, which collectively constitute a support for the inner ends of the spokes to abut against. (See Figs. 3, 4, and 5.)

The center of the interior of each portion A B is bored out for the reception of a hollow screw-threaded axle-box H, over which turns a conical or externally-tapering nut I, its outer inclined surface corresponding to the inner tapering surface of the wedges $h$ $h$ and fitting therein. The head of this conical nut or bearing expander may have a polygonal outer surface $i$, to which to apply the jaws of an ordinary wrench, the outer portion A of the hub being first removed by turning it off the screw-threaded axle-box. $k$ is a set-screw for preventing the accidental unscrewing of the outer portion of the hub from the axle-box, Fig. 2.

When the new wheel leaves the shop of the maker, the felly and tire are properly expanded by the spokes; but after the latter become loose in the hub from constant use of the wheel or from changes of the weather, &c., and the felly or a portion of it is insufficiently supplied thereby and needs tightening or setting up, it is only necessary to remove the outer portion of the hub and with the wrench turn the nut until its conical surface is forced with sufficient pressure upon the inner surface of the wedge-shape bearing-pieces $h$ $h$, which in turn are forced out against the inner ends of the spokes, which thus expand the felly and restore it to its perfect original circular shape, thus taking up all looseness and preventing the play of the parts.

The wedge-shape pieces $h$ $h$ may be dispensed with and the end of each spoke be provided with a round-headed screw $m$ or other suitable metal device which may bear directly against the exterior tapering surface of the conical nut I, which may be of metal. (See Fig. 12.)

The portion A may have the flange $c$ formed thereon and the portion B the annular groove $a$, if desired.

Wedges may be employed for forcing some spokes outwardly beyond the others, and the wooden ends of the spokes may bear directly against the wedging device.

I claim—

1. In a vehicle-wheel the combination of an axle-box of uniform diameter from one end to the other end and having its periphery screw-threaded the whole length thereof, and upon said axle-box a nut having a conical surface a portion of its length and a polygonal surface on its largest end, the inner part B of the hub screwed upon the axle-box and the outer part A of said hub also screwed upon the axle-box with spokes interposed between the parts A and B of the hub substantially as described.

2. In a vehicle-wheel the combination of an axle-box having its periphery screw-threaded the whole length thereof, and upon said axle-box, a nut conical a portion of its length and polygonal at its largest end, internally-conical wedges upon the conical portion of the nut, the inner part B and the outer part A of the hub screwed upon the axle-box and spokes interposed between the parts A and B substantially as described.

Witness my hand this 14th day of November, 1895.

JOHN N. ALTMAN.

In presence of—
 N. W. STEARNS,
 C. F. STEARNS.